United States Patent

[11] 3,602,830

[72] Inventor Edward T. E. Hurd, III
Cinnaminson, N.J.
[21] Appl. No. 868,043
[22] Filed Oct. 21, 1969
[23] Division of Ser. No. 670,822, Sept. 8, 1967, Pat. No. 3,562,729
[45] Patented Aug. 31, 1971
[73] Assignee Honeywell Inc.
Minneapolis, Minn.

[54] A CONSTANT CURRENT CONTROL CIRCUIT
2 Claims, 6 Drawing Figs.

[52] U.S. Cl. .......... 330/22, 307/297, 307/304, 330/35, 330/40
[51] Int. Cl. .......... H03f 3/16
[50] Field of Search .......... 330/22, 40, 35; 307/297, 304

[56] References Cited

UNITED STATES PATENTS

| | | | |
|---|---|---|---|
| 3,421,098 | 1/1969 | Fisher | 330/22 X |
| 3,467,909 | 9/1969 | Avins et al. | 330/22 X |
| 3,518,458 | 6/1970 | Camenzind | 330/40 X |

OTHER REFERENCES

" Using FETS for Precision Milivolt Sources," Electronic Design, Vol. 12, #3, Feb. 3, 1964, p. 42 330-35

*Primary Examiner*—Roy Lake
*Assistant Examiner*—James B. Mullins
*Attorneys*—Arthur H. Swanson and Lockwood D. Burton

ABSTRACT: There is disclosed a voltage (millivolts)-to-current transducer which transmits a current signal to a remote central station, which includes a power supply for a utilization device at the remote location, over a two-wire transmission line. The transmission line carries both the signal current from the transmitter to the remote station and the total power supply for the transmitter. A highly stable constant current source uses a field effect transistor as an element thereof. A variable resistor and temperature compensating diode are connected in series with the drain-source path of the field effect transistor and the gate of the field effect transistor is connected to the junction of a load and the diode. Further, a plural-stage amplifier has the DC power supply of the first amplifier stage of the plural stages isolated from the constant DC power supply of the following stages. The isolation is accomplished by means of a transistor having a constant voltage applied to the base thereof and having the constant DC power supply of the following stages applied to the collector thereof. The emitter is connected to the first amplifier stage to thereby supply the DC power supply thereto.

INVENTOR.
EDWARD T. E. HURD III

Lockwood D. Burton

ATTORNEY.

INVENTOR.
EDWARD T. E. HURD III

Lockwood D. Burton

ATTORNEY.

INVENTOR.
EDWARD T. E. HURD III

Lockwood D. Burton

ATTORNEY.

A CONSTANT CURRENT CONTROL CIRCUIT

This is a division of the copending application bearing Ser. No. 670,822, filed Sept. 8, 1967 and now U.S. Pat. No. 3,562,729.

The present invention relates to electrical apparatus, and more particularly to a signal conditioner or transducer-transmitter.

In the art of industrial process control, measurements are made of various conditions in the process under control. Often, the signal produced by the condition sensor is a voltage signal of a magnitude measured in millivolts. One such sensor frequently used in these control systems is a thermocouple. Seldom can the millivoltage signal be used directly in such a system. The signal must be amplified, compensated and frequently converted to a current signal of predetermined range before it can be used effectively in a control system. Heretofore, it has been necessary to provide the thermocouple or other comparable sensors with a specially designed pair of compensated leads to conduct the sensor signal from the sensor at the process location to a remotely located signal transducer-transmitter. These long coupling leads are expensive and have long presented complication in the system which, for lack of a reasonable alternative, have been tolerated. Further, the transducer-transmitter units known as millivolt-to-current transducers, have required either a local power supply or a separate pair of leads to supply power to the transducer from a remote source. There are, of course, other sensing means which also produce a millivolt output signal, such, for example, as resistance bulbs and strain gage. These also require that the millivoltage signal be amplified and converted before transmission to the remote control, or indicating station.

It is accordingly, an object of the present invention to provide an improved transducer-transmitter which obviates the foregoing deficiencies of the prior art apparatus.

It is another object of the present invention to provide an improved transducer-transmitter which may be placed in close proximity to the sensor, obviating the need for compensated connecting leads between the sensor and the transducer.

It is a further object of the present invention to provide an improved transducer-transmitter as set forth which derives its energizing power from the remote station to which the signal is transmitted yet requires only a two-wire transmission line for the transmission of both the signal and the energizing power.

It is yet another object of the present invention to provide an improved transducer-transmitter, as set forth, which greatly minimizes the need for input-output isolation.

It is still another object of the present invention to provide an improved transducer-transmitter, as set forth, which, when used with thermocouples, includes reference junction temperature compensation.

It is still a further object of the present invention to provide an improved transducer-transmitter which includes adjustable span and suppression means without interaction between them.

In accomplishing these and other objects, there has been provided, in accordance with the present invention, a solid-state transducer-transmitter which is sufficiently small that it may be built into a part of the sensor housing, taking advantage of the small size of integrated or partially integrated circuit techniques. The system is designed to have an output current signal which varies between lower and upper limits such as from 4 to 20 ma. Power supply from a remote station is applied to the transmitter along a pair of transmission leads. The current supplied from the remote source is controlled at the transmitter. That portion of the transmitted energy which lies below the lower limit is utilized to energize the transmitter. That latter portion of the transmission line energy which lies below the lower limit is utilized to energize the transmitter. That latter portion of the transmission line energy which is used to energize the transmitter is, in turn, subjected to control elements whereby a stable energization is provided for the transmitter. By eliminating substantially all of the impedance from the reference leg of the sensor and the transducer, the need for input-output isolation is minimized.

A better understanding of the invention may be had from the following detailed description when read in connection with the accompanying drawings, in which.

Figure 1:
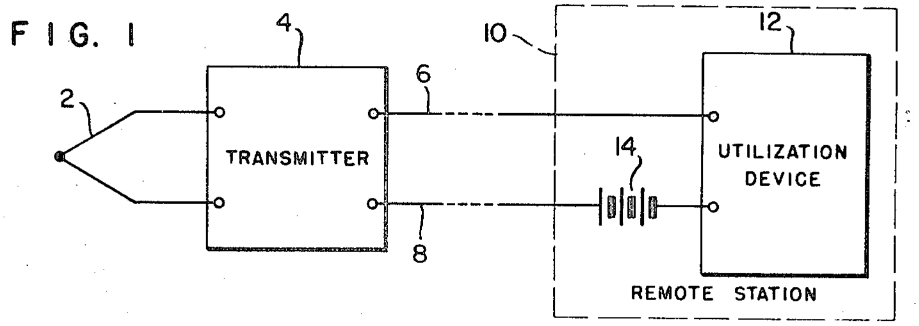
FIG. 1 is a block diagram illustrating one aspect of the present invention.

Referring now to the drawings in more detail, there is shown in FIG. 1, a very much simplified block diagram of a system which embodies the present invention. There a primary sensor is represented by a thermocouple junction 2 which is directly connected to a transducer-transmitter 4. The output of the transducer-transmitter 4 is connected by a pair of leads 6 and 8 respectively to a remote station 10. The leads 6 and 8 are shown partly in dotted line to indicate that the remote station 10 may be located at a substantial distance, a distance that may be measured in miles, from the transmitter 4. At the remote station 10, there may be one or more controlled instrumentalities such as indicators, recorders, or controllers. These instrumentalities are indicated generally in FIG. 1 as a utilization device 12. Also located at the remote station is an electrical power supply represented by a battery 14.

As will be described in more detail hereinafter, the transducer-transmitter 4 includes, in its output circuit, electric current control means which operate to control the magnitude of the current flowing in the leads 6 and 8, and through the utilization device, from the power supply 14. The output current control device is, in turn, controlled by the magnitude of a voltage signal, measured in terms of millivolts, derived from the primary sensor as represented by the thermocouple junction 2. Not only does the power supply 14 supply the current which is controlled by the output circuit of the transmitter 4, but it constitutes the only power source for the energization of the transmitter 4. Thus, the leads 6 and 8 extending between the transmitter 4 and the remote station 10 carry both the controlled signal for actuation of the utilization device and the energizing current for the transmitter itself. This will be more apparent after the circuitry of the transducer-transmitter 4 is described.

Figure 2:
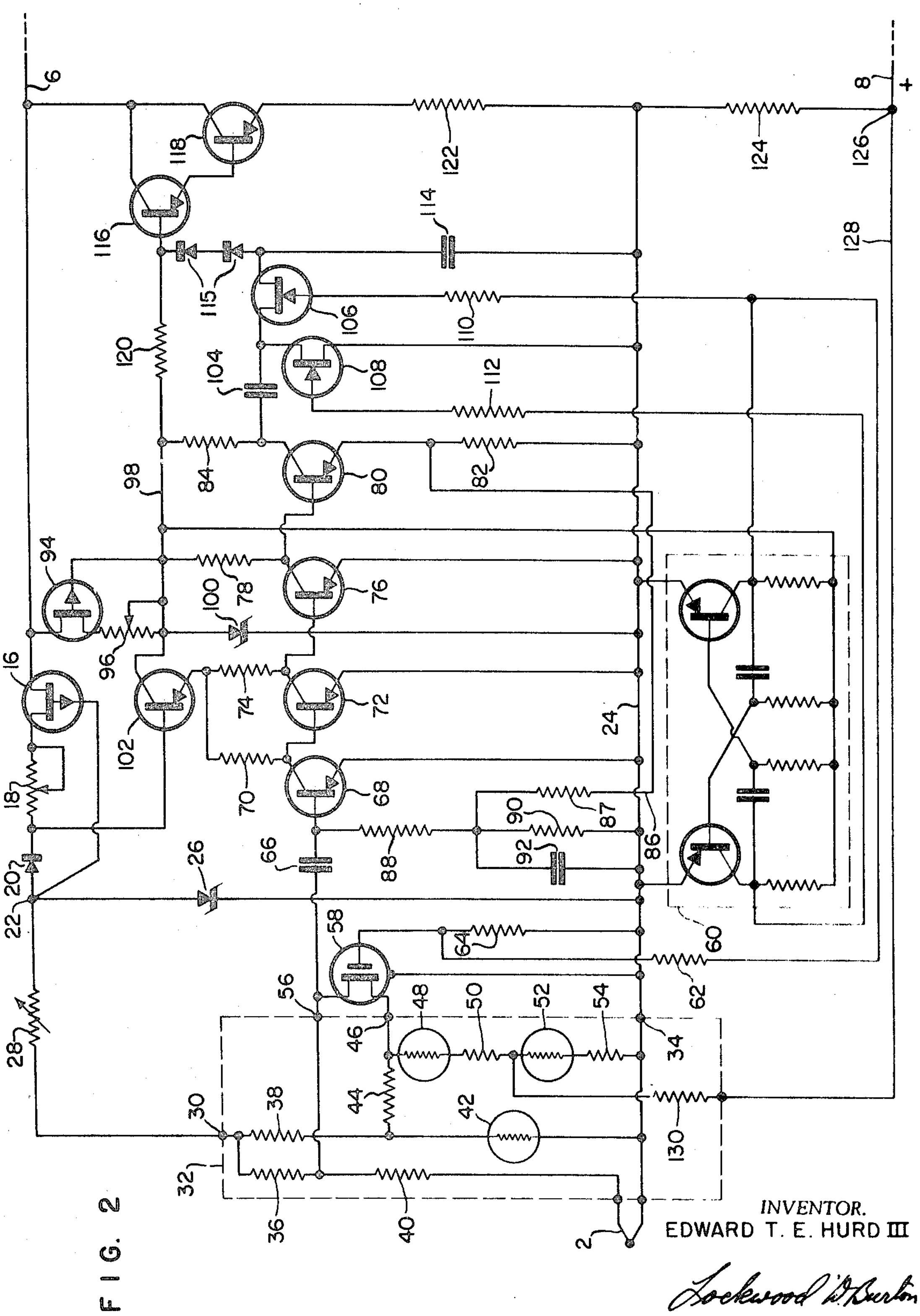
FIG. 2 is a schematic circuit diagram showing details of a circuit embodying the present invention including a thermocouple input.

A preferred embodiment of the present invention includes the circuitry for the transducer-transmitter 4 is shown in substantial detail in FIG. 2. As there shown, the transmission lead 6 is connected to the drain electrode of a first field effect transistor 16. The source electrode of the field effect transistor 16 is connected through a variable resistor 18 and a temperature compensating diode 20 to a junction 22. The gate electrode of the transistor 16 is directly connected to the junction 22. Connected in this manner, the transistor 16 constitutes a highly stable constant current unit. Connected between the junction 22 and a reference voltage lead, or transmitter common 24, there is connected a constant voltage means. The constant voltage means is represented by the Zener diode 26. An adjustable constant-voltage-unit calibrating resistor 28 is connected between the junction 22 and a terminal 30. A so-called measuring circuit 32 is connected between the terminal 30 and a terminal 34 on the transmitter common lead 24. The measuring circuit 32 is basically in the form of a resistive bridge. In the form shown in FIG. 2, the measuring circuit is especially designed for use with a thermocouple-type sensor and includes means providing a very accurate cold-junction, or reference junction, compensation necessary in thermocouple measuring circuits. This measuring circuit bridge includes a resistor 36 connected to the terminal 30 and constituting a first arm of the bridge. Also, connected to the terminal 30 is a second arm of the bridge and includes a resistor 38. The third arm of the bridge connected between the resistor 36 and the terminal 34 includes a resistor 40 and a sensing element or thermocouple 2. In order to provide precision in thermocouple compensation, the fourth arm of the bridge connected between the resistor 38 and the terminal 34 is a compound resistive network. This network includes a first temperature sensitive resistor 42 directly connected between the resistor 38 and the terminal 34; a resistor 44 is directly connected between a bridge output terminal 46 and the junction between the resistors 38 and the temperature sensitive resistor 42. Also, included in the compound resistive arm of the bridge is a series of resistors connected between the terminal 46 and the terminal 34. These include the temperature sensitive resistor 48, a resistor 50, another temperature sensitive resistor 52 and a resistor 54. The junction between the resistors 36 and 40 is directly connected to a second bridge output terminal 56. The bridge output terminals 46 and 56, respectively, are connected to the two symmetrically conductive electrodes of an insulated gate field effect transistor 58. The shell or casing of the transistor 58 is connected to the transmitter common lead 24. The insulated gate of the transistor 58 is connected to one output terminal of a multivibrator 60 through a resistor 62. The multivibrator 60 is of a conventional design employing two transistors and oscillates at any suitable frequency such, for example, as 200 c.p.s. A bias resistor 64 is also connected between the gate electrode of the transistor 58 and the common lead 24. Thus connected, the transistor 58 constitutes a signal chopper as well as constituting a differential input stage for a transistor AC amplifier.

That electrode of the transistor 58 which is connected to the bridge terminal 56 is connected through a coupling capacitor 66 to the base electrode of a transistor 68. The transistor 68 comprises the first stage of a four-stage transistor amplifier. The emitter electrode of the transistor 68 is connected to the common lead 24. The collector of thy transistor 68 is connected through a load resistor 70 to a power supply means which will be described in more detail hereinafter. The collector electrode of the transistor 68 is directly connected to the base electrode of a second stage transistor 72. This transistor, too, has its emitter directly connected to the common lead 24 and its collector electrode connected through a load resistor 74 to the aforementioned power supply. The collector of the transistor 72 is connected to the base electrode of a third stage transistor 76. The transistor 76 also has its emitter directly connected to the common lead 24 and its collector connected through a load resistor 78 to a power supply lead. Also, the collector of the transistor 76 is directly connected to the base electrode of the fourth stage transistor 80. The emitter of the transistor 80 is connected through an emitter-follower resistor 82 to the common lead 24. The collector of the transistor 80 is connected through a load resistor 84 to the same power supply lead as is the transistor 76. A DC feedback internal to the AC amplifier is connected by a a lead 86 between the emitter of the transistor 80 and an input bias network associated with the electrode of the first stage transistor 68. That bias network includes a first and a second bias resistor 88 and 90, respectively, connected in series between the base of the transistor 68 and the common lead 24. A bypass capacitor 92 is connected in parallel with the bias resistor 90. The feedback lead 86 is connected through resistor 87 to the junction between the resistor 88 and the resistor 90.

The power supply for the four-stage amplifier includes a second constant current unit substantially similar to that previously described involving the field effect transistor 16. The second constant current means includes a field effect transistor 94 having its drain electrode also connected to the transmission lead 6. The source electrode of the transistor 94 is connected through an adjustable series resistor 96 to an intermediate power supply lead 98 to which the load resistors 78 and 84, respectively, are connected. A constant voltage unit represented by the Zener diode 100 is connected between the lead 98 and the common lead 24. In order to provide the necessary isolation between the groups of stages in a high gain transistor amplifier whereby to eliminate spurious interaction and oscillation, a dynamic isolator means is provided. This dynamic isolator means includes a transistor 102 having its collector electrode connected directly to the supply lead 98 and its base electrode connected to the junction between the variable resistor 18 and the temperature compensating diode 20. The emitter electrode of the transistor 102 is connected directly to the load resistors 70 and 74 associated with the transistors 68 and 72, respectively. As thus connected it may be seen that the collector of the transistor 102 is connected to a point of constant voltage determined by the Zener diode 100 and the base electrode is connected to a point of constant voltage determined by the Zener diode 26. It will be appreciated, of course, that the voltage established by the Zener diode 100 is somewhat larger than the voltage established by the Zener diode 26. For example, in a system constructed in accordance with the present invention, the voltage established by the Zener diode 100 was on the order of 8 v. while the voltage established by the Zener diode 26 was on the order of 6.4 v., thus providing a proper energization of the transistor 102. As connected, the voltage at the base of the transistor 102, minus the base-emitter diode drop, appears at the emitter of the transistor 102, thus providing a constant voltage at the termination of the load resistors 70 and 74. The collector of this transistor 102, which derives its power from the lead 98, appears as a constant current source at the lead 98. Thus, the dynamic isolator greatly attenuates any fluctuations that appear at lead 98 substantially preventing their application to the load circuit of the earlier transistor stages.

The output signal form the amplifier is applied, through a coupling capacitor 104 connected to the collector of the transistor 80, to a signal demodulator. The signal demodulator includes a first field effect transistor 106, having its symmetrically conducting electrodes serially connected between the coupling capacitor 104 and an output amplifier circuit, and a second field effect transistor 108, having its symmetrically conducting electrodes serially connected between the coupling capacitor 104 and the common lead 24. The gate electrode of the transistor 106 is connected through a resistor 110 to the same output terminal of the multivibrator 60 to which the gate electrode of the transistor 58 is connected. The gate electrode of the transistor 108 is connected through a resistor 112 to the opposite output terminal of the multivibrator 60. Thus the field effect transistor 106 and 108, respectively, are gated into conduction during alternate half cycles of the output signal of the multivibrator 60; the transistor 106 being gated synchronously and in phase with the transistor 58.

The output amplifier circuit connected to the transistor 106 includes a smoothing capacitor 114 connected between the output electrode of the transistor 106 and the common lead 24, and a pair of coupling diodes serially connected between the output electrode of the transistor 106 and the base electrode of a transistor 116. The transistor 116 comprises the first stage of a Darlington pair, the second stage of which is a transistor 118. Bias for the base of the transistor 116 is provided by a resistor 120 connected between the base of the transistor 116 and the supply lead 98. The collector of the transistor 116 is directly connected to the collector of the transistor 118 and the both are connected to the transmission lead 6. The emitter of the transistor 116 is directly connected to the base electrode of the transistor 118. The emitter of the transistor 118 is connected through a small resistor 122 to the common lead 24. The common lead 24 is connected through a small precision resistor 124 to the other transmission lead 8 at a junction 126 a lead 128 is connected from the junction 126, through a resistor 130 to the junction between the resistor 50 and 52 in the measuring circuit 32. This latter connection constitutes a DC feedback connection for the transducer-transmitter.

In operation, the electrical energy supplied to the transducer-transmitter 4 along the leads 6 and 8 is divided at the transducer-transmitter into at least two parallel paths. In the illustrated embodiment of the invention, the second one of these paths is actually divided, in turn, into two parallel paths. The first of the parallel paths is provided with means to control the current flowing therethrough in accordance with the magnitude of an input signal. The other, or remaining, paths include constant current control means. Thus, the energization of the active elements of the transducer-transmitter is effected through these constant current control means and consequently draws a constant current from the supply line. This current is established at less than the minimum current defined by the current range requirements, of the the utilization device. As previously mentioned herein, in the illustrative embodiment of the apparatus the current range of the system was established at from 4 to 20 ma. Accordingly, the current drawn by the transducer-transmitter for the energization thereof is controlled at something less than 4 ma. The first mentioned current path, being controlled in accordance with the magnitude of the input signal, and being the only variable current path in the transducer-transmitter, effects the only control over the current flowing in the transmission leads 6 and 8 within the range of 4 to 20 ma. Thus, the transducer-transmitter 4 obtains its energization from the same remote power source as does the utilization device 12 and yet controls the current flowing in those transmission lines in a manner to produce a controlled current signal representative of the process variable to which the sensor 2 is exposed, the sensor 2 in turn having produced a control signal measured in terms of millivolts.

More specifically, the connection of the field effect transistor 16 to the transmission line 6 constitutes a highly regulated constant current control means. The variable resistor 18 serves two fundamental purposes; first, it serves to increase the series impedance, effectively, of the transistor 16, second, it provides a measure of degenerative coupling between the source and gate electrodes to define and establish a stable current level for the current controller. Since this constant current device is used to supply energization to the very sensitive measuring circuit, the diode 20 is included in the circuit to provide a measure of temperature compensation to offset any tendency for the transistor 16 to vary its conductivity characteristic with changes in ambient temperature. The Zener diode 26 connected between the junction 22, following the constant current control unit, and the common lead 24 establishes a highly regulated constant voltage source for the energization of the measuring circuit 32. The Zener diode 26 is, of course, of the temperature-compensated self-regulating type. The variable resistor 28 provides means for establishing a precise predetermined voltage across the terminals 30 and 34 such as is needed by a particular measuring circuit. For example, the voltage across the Zener diode 26 may be 6.4 v. while the desired voltage across the terminals 30 and 34 is exactly 6 v. This adjustment is accomplished through the use of the variable resistor 28.

As was previously mentioned the measuring circuit itself is fundamentally in the form of a resistive bridge with the terminals 30 and 34 being the input or energizing terminals thereof and the terminals 46 and 56 being the output terminals. Since the measuring circuit is in the form of a bridge and the primary sensor 2 is one of the elements of that bridge, a portion of the energizing current through the bridge passes through the primary sensor 2. This arrangement produces an automatic alarm condition whenever the primary sensor fails as by burnout or short circuit. The resistors 36, 38, 40, 42, 44, 48, 50, 52 and 54 constituting the bridge are so selected that their relative values provide the amount of suppression and the direction of the suppression required in each individual application. These values may be calculated in accordance with recognized bridge theory. Since the response characteristic of a thermocouple follows a curve which is approximately the characteristic of a quadratic equation, the so-called cold junction compensation should be arranged to follow the same curve. In the present application this quadratic relationship is achieved through the use of the temperature sensitive resistor 42, the fixed resistor 44, the temperature sensitive resistor 48, and the fixed resistor 50. The temperature sensitive resistor 52 and the fixed resistor 54 are much smaller in value than the resistors 48 and 50, accordingly, their influence on the cold junction compensation is substantially negligible. The feedback resistor 130 fixes the "span" of the measuring circuit. However, that span determination may also vary with ambient temperature, therefore the temperature sensitive resistor 52 together with the fixed resistor 54 provide means for compensating for such thermal variations in span. Because of the relative magnitudes of the resistors involved, the span compensation does not significantly interact with the cold junction compensation. It should be noted that the sensor 2 is located in one-half of the bridge which we may refer to as the positive side of the bridge while all of the compensation is located in the other half or negative side of the bridge. Because of this arrangement there is very little impedance between the thermal junction of the thermocouple 2 and the reference or common lead 24. In fact, there is only the impedance of the thermocouple itself and the resistance of the lead 24. To a great extent this slight impedance is so small as to be negligible. The presence of significant impedance in the circuit of the reference leg of the thermocouple, as heretofore, causes considerable problems of so-called common-mode signals resulting in spurious signals being introduced into the thermocouple by a grounding or partial grounding of the thermocouple. Erroneous currents tend to flow in such grounded circuits. When there is substantial impedance in the reference leg of a thermocouple, these currents produce spurious voltage signals which appear at the input terminals of the amplifier. In the circuit according to the present invention, the only significant impedance in the circuit of the reference leg of the thermocouple is the feedback resistor 124. The location of that resistor 124 is such that spurious signals developed thereacross are attenuated by a factor equal to the loop-gain of the transducers amplifier. Thus, if the loop-gain amplifier is 1,000, the effect of such spurious signals is attenuated by a factor of 1,000. In order to minimize even that effect, it is contemplated that the thermocouple 2 within its protective tube will be electrically insulated from the tube and any other source of grounding contact.

In previous apparatus, there have been instances when it was found to be necessary to provide conductive isolation between the input and output circuits of such transducers. This was for the purpose of blocking the spurious signals resulting from the grounding of the thermocouple. It is apparent that, with the present apparatus, such isolation is largely unnecessary.

The output terminal 56 of the measuring circuit 32 is connected to that side of the measuring circuit bridge which has been identified as the positive side. The potential appearing thereat with respect to the reference lead 24 is the thermojunction signal plus a positive suppression signal. The output terminal 46 of the measuring circuit 32 is connected to that side of the measuring circuit bridge which has been identified as the negative side. The potential appearing at the junction 46 with respect to the reference lead 24 is a potential which corresponds to the cold junction compensation signal plus a negative suppression signal. These terminals 46 and 56, respectively, are connected to the symmetrically conductive electrodes of the insulated gate field effect transistor 58. The path between the two symmetrically conductive electrodes of the transistors 58 is conditioned to be alternately conductive and nonconductive in accordance with the application of a series of square wave triggering pulses applied to the gate electrode thereof from the multivibrator 60. This alternate triggering of the transistor 58 produces an output signal from the transistor 58 which is a square wave, alternating in magnitude, with respect to the reference of common lead 24, between the potential at the measuring circuit output terminal 56 and the potential at the measuring circuit output terminal 46. In other words, the output signal from the transistor 58 is a square wave signal whose amplitude is proportional to the difference of the potential at the terminals 56 and 46 and it includes a DC offset voltage. That DC offset voltage is blocked by the coupling capacitor 66 allowing only the square wave whose amplitude represents the potential difference between the terminals 56 and 46 to be applied as input signal to the four-stage transistor AC amplifier.

The transistor amplifier, so far as the signal amplification is concerned, is a straightforward four-stage, cascade, direct-coupled, amplifier. DC feedback for stability is derived from an emitter follower connected in the emitter circuit of the last stage 80 of the transistor amplifier and applied, by means of the feedback lead 86 through the resistor 87 to the input of the first stage 68 of the transistor amplifier. The energization of the transistor amplifier, however, is unique. As is well known, in a multiple stage high gain transistor amplifier there must be a measure of isolation in the power supply circuit between the latter stages and the earlier stages of the amplifier. Otherwise, the amplifier becomes unstable in its operation. In accordance with the present invention, energization of the amplifier is accomplished through a constant current circuit including the field effect transistor 94 and the variable resistor 96. This combination is connected between the transmission line 6 and the intermediate power supply line 98. Between the supply line 98 and the transmitter common lead 24 there is connected the constant voltage unit represented by the Zener diode 100. Here too, the Zener diode is of the self-regulating type. This combination of constant current unit and constant voltage unit serially connected between the transmission lead 6 and the transmitter reference lead 24 is, with the exception of the temperature compensated diode 20, identical, to the constant current unit and constant voltage unit which supplies energization to the measuring circuits. As was previously mentioned, the Zener diode 100 is selected to provide a slightly higher constant voltage than is the Zener diode 26. In this manner, a constant voltage of predetermined level is established between the intermediate power supply lead 98 and the transmitter reference lead 24 for the energization of the last two stages 76 and 80 of the four-stage transistor amplifier. The multivibrator 60 is also energized from this same supply. The transistor 102 provides a dynamic isolation stage in the power supply between the intermediate supply lead 98 and the energization of the first two transistor stages 68 and 72 of the transistor amplifier. The constant voltage across the Zener diode 100 being applied to the collector of transistor 102 and the constant voltage across the Zener diode 26 being applied to the base electrodes of the transistor 102, there is effectively a constant current at the collector of the transistor 102, there is effectively a constant current at the collector of the transistor 102 and a constant voltage at the emitter thereof. Thus, any tendency for ripple, occuring in the power supply at the lead 98 as a result of the operation of the high gain output stages of the transistor amplifier, being reflected back into the earlier stages, whereby to produce the undesired instability, is obviated without the use of RC networks which have heretofore been employed.

The output signal of the amplifier is coupled through a coupling capacitor 104 to a synchronous demodulator which includes the field effect transistors 106 and 108. These transistors are alternately triggered into conduction by pulses supplied from the multivibrator 60 and in synchronism with the gating operation of the transistor 58, the transistor 106 being actuated in phase with the transistor 58 and the transistor 106 being actuated in phase with the transistor 58 and the transistor 108 being actuated out of phase with the transistor 58. This results in a DC control signal being established across the capacitor 114 which is proportional to the difference across terminals 40 and 56 signal. This control signal is coupled, through the coupling diodes 115 to the input of the Darlington usually which merely the transistors 116 and 118. The control signal supplied to the base of the transistor 116 effects a control in the conductivity of, hence, the current flowing through the transistor 118 in accordance with the magnitude of the control signal. This in turn controls the variations in the current, as aforesaid, flowing in the transmission leads 6 and 8.

I should be noted that the current flowing through the resistor 124 includes that current flowing through the controlled current leg, i.e. the transistor 118 as well as the current f which flows through the energizing circuit of the transmitter-transducer. This arrangement provides an automatic compensation for any variation that may occur as a result of thermal changes in the characteristics of the constant current energizing circuits.

Figures 3, 6:
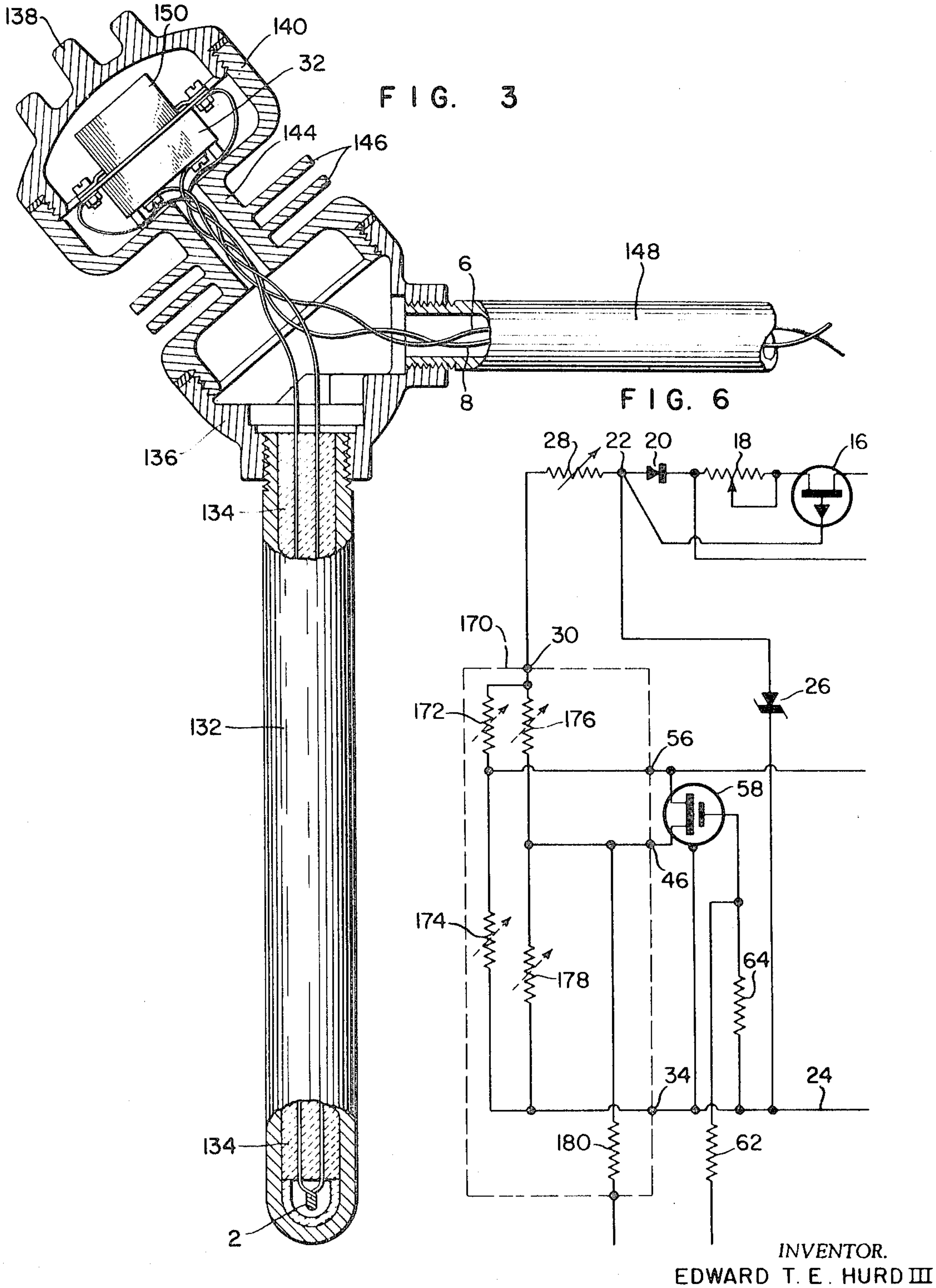
FIG. 3 is a pictorial representation of the relationship of certain of the parts of structure embodying the present invention.
FIG. 6 is a schematic circuit diagram of a portion of the circuit shown in FIG. 2 but featuring a strain gage input means.

As was previously mentioned, due to the small size achievable in electronic circuitry due to the employment of integrated circuit techniques or semiintegrated circuit techniques, so called hybrid circuits, the measuring circuit 32 and the remainder of the transducer-transmitter may be positioned in close proximity to the primary sensor. One arrangement for accomplishing such positioning is shown in FIG. 3. A thermocouple 2 is shown mounted within a conventional protecting tube or thermocouple well 132. The interior of the tube 132 is filled with a suitable electrically insulating material such as compacted magnesium oxide 134. That material surrounds the thermocouple leads and electrically insulates those leads from each other and from the protective tube 132. The protective tube 132 is secured to a standard thermocouple well head 136. The head 136 usually contains merely a terminal block to which the thermocouple leads and the corresponding extension leads are secured. Conventionally, the well head is closed by a cap member which is provided with a screw-threaded projection whereby the cap may be secured to the well head. In a preferred embodiment, however, between the conventional cap 138 and the well head 136 there is provided an adapter extension 140. At one end the adapter extension is provided with a screw-threaded extension to match and mate with the corresponded threaded portion of the well head. The extension provides a receptacle 142 at the end thereof remote from the well head for the accommodation of the transducer-transmitter transmitter hereinbefore described. That receptacle 142 is provided with a screw-fitted portion adapted to receive the threaded extension of the cap 138. Between the receptacle of the extension 140 and that portion which attaches to the well head 136 there is a relatively narrow interconnecting neck portion 144 which is provided with a pair of heat radiating fins 146. Also connected to the well head 146 is an output conduit 148. The transmission leads 6 and 8 are carried by that conduit to a position to be determined safely remote from the environment to which the thermocouple is exposed.

While it is not essential that the adapter extension be used, (the transducer-transmitter could be fitted into the normal well head) the extension is preferred as a means of housing the transducer-transmitter in an atmosphere which is of substantially lower temperature than that found in the conventional well head. In as much as the transducer-transmitter has a relatively universal application it is also preferred that the transducer-transmitter be produced as a separate module 150 and the measuring circuit 32 as another module, The two modules may be then clamped together as by a plurality of screws 152 which also provides the interconnection between the two modules.

Figure 4:
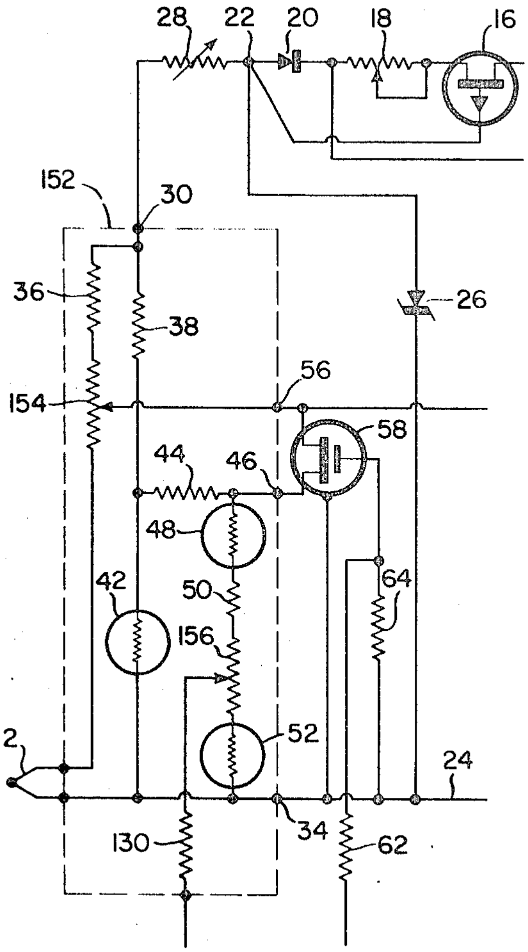
FIG. 4 is a schematic circuit diagram of a portion of the circuit shown in FIG. 2 but illustrating the use of adjustable components in place of the fixed components shown in FIG. 2.

In FIG. 1, the measuring circuit module 32 was indicated as having a fixed span and a fixed suppression. These features are ones which could be readily be predetermined for specific applications. These components may also be matched to the particular primary sensor with which they are intended to operate. AS fixed units they may be extremely small and incorporated into the integrated circuitry. However, for those instances where greater flexibility of the measuring circuit is desired and the small size modular construction is not required, the measuring circuit may be provided which includes adjustable span and adjustable suppression without deviating from the principles set forth in connection with the measuring circuit 32. Such an adjustable measuring circuit is illustrated in FIG. 4. Here the components which correspond to those in FIG. 2 bear the same reference numerals as do the corresponding parts in FIG. 2. In FIG. 4, the measuring circuit 152 is connected across the constant voltage power supply terminals 30 and 34. The measuring circuit 152 is identical in all respects to the measuring circuit 32 with the exception that a slidewire resistor 154 is used in place of the fixed resistor 40 in the positive side of the bridge, and a slidewire resistor 156 replaces the fixed resistor 54. The slider associated with the slidewire resistor 154 is directly connected to the measuring circuit terminal 56. Adjustment of that slider provides an adjustment in the suppression to any desired value within the range of adjustability. The slider associated with the slidewire resistor 156 is connected to the span resistor 130. The adjustment of the slider along that slidewire resistor 156 provides an adjustment of the span of the measuring circuit within the range of adjustability.

Figure 5:
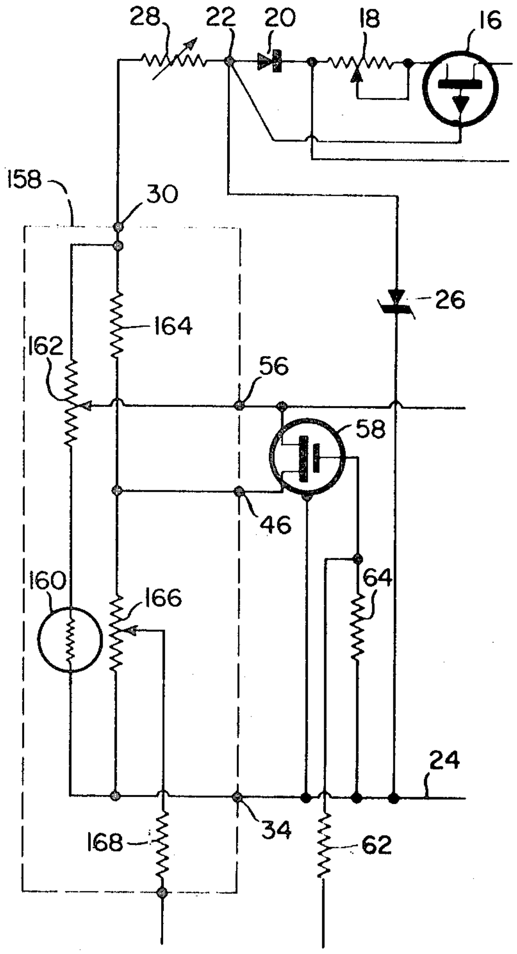
FIG. 5 is a schematic circuit diagram of a portion of the circuit shown in FIG. 2 but featuring a resistance bulb input means.

In FIG. 5 there is shown a measuring circuit 158 which includes a resistance bulb 160 as the primary sensor. Again the measuring circuit is in the form of a bridge with the primary sensor comprising one of the arms of the bridge. The bridge includes in its "positive" side a slidewire resistor 162 and a primary sensor or resistance bulb 160. The slider associated with the slidewire resistor 162 is directly connected to the terminal 56. The "negative" side of the bridge includes a fixed resistor 164 and a slidewire resistor 166. The junction between the resistors 164 and 166 is connected to the terminal 46. The slider associated with the slidewire resistor 166 is connected to the span resistor 168 which corresponds to the span resistor 130 of the circuit shown in FIGS. 2 and 4.

As in the case of the measuring circuits shown in FIG. 4, the adjustable sliders here associated with the resistors 162 and 166 provide an adjustable suppression and span, respectively, again within the range of adjustability.

In FIG. 6 there is shown a measuring circuit 170 wherein the primary sensor comprises a strain gauge. The strain gauge 170 comprises a four-arm resistive bridge wherein at least one of the arms, and possibly all four of the arms, include strain-sensitive resistors. In the illustrated embodiment, the first arm of the bridge comprises the resistor 172 and, in the same side of the bridge a resistor 174. In the other side of the bridge there is a resistor 176 and a resistor 178. The junction between the resistors 172 and 174 is directly connected to the terminal 56 and the junction between the resistors 176 and 178 is directly connected to the terminal 46. As noted, any one of these four resistors may be a strain-sensitive resistor thereby constituting the primary sensor. On the other hand any two of the resistors may be of the strain-sensitive type. Still further and for other purposes, all four of these resistors may be of the strain-sensitive type. As before, a feedback resistor 180 which in this case may be connected directly to the terminal 46, establishes the span of the measuring circuit.

Thus, if may be seen that there has been provided, in accordance with the present invention, an improved millivolt-to-current transducer-transmitter which is characterized by a two-wire transmission line for coupling the transmitter to a remote central station and wherein the transducer-transmitter derives its energization from those same two wires of the transmission line without the need of either a local power supply or a separate leads for connection to a remote power supply. A further feature of the present invention is seen in the minimization of the need for isolation between the input and output circuits of the transmitter.

The embodiments of the invention in which an exclusive property or privilege is claimed are defined as follows:

1. A constant current control circuit means connected in series between a power supply source means and a load device, said circuit means comprising a field effect transistor having a pair of symmetrically conductive electrodes and a gate electrode, a resistor, said symmetrically conductive electrodes being serially connected between the power supply source means and said resistor, a temperature compensating diode connected in series between said resistor and said load device, and a connection from the junction between said load device and said diode to said gate electrode of said transistor.

2. In a plural-stage amplifier, a power supply system for said amplifier comprising a first supply lead, a reference lead, the plural stages of said plural-stage amplifier being connected to be energized between said first supply lead and said reference lead, dynamic isolation means for isolating the energization of a first portion of said plural stages from the energization of a second portion of said plural stages whereby to prevent spurious interaction between said first supply lead and said first portion of said plural stage, said second portion of said plural stages being connected directly to said first supply lead; said dynamic isolation means comprising a transistor having a base electrode, a collector electrode and an emitter electrode, constant voltage control means connected to apply a constant voltage bias signal at said base electrode, means including said first supply lead for applying a constant voltage bias at said collector electrode, and means connecting said first portion between said emitter electrode and said reference lead.